Feb. 25, 1947. J. J. WISLER 2,416,365
FLUID COOLED ELECTRODE
Filed Dec. 2, 1944
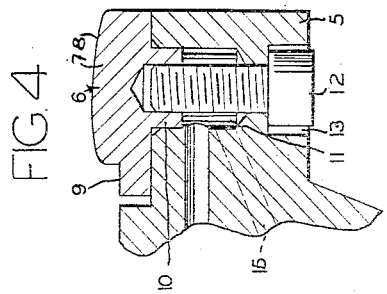
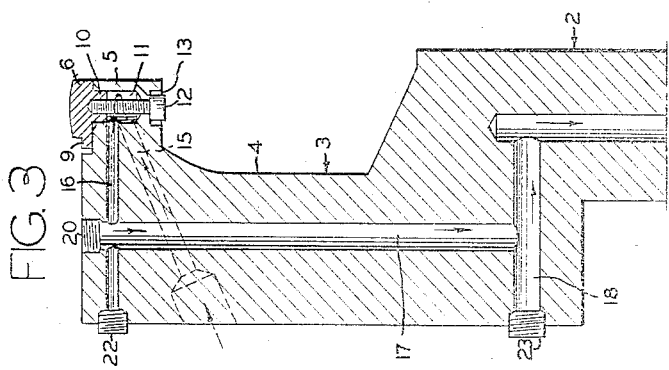
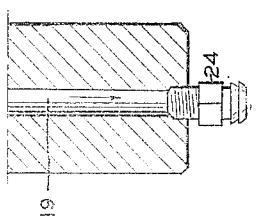
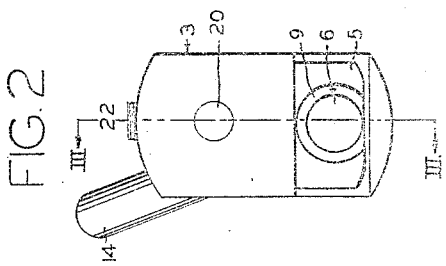
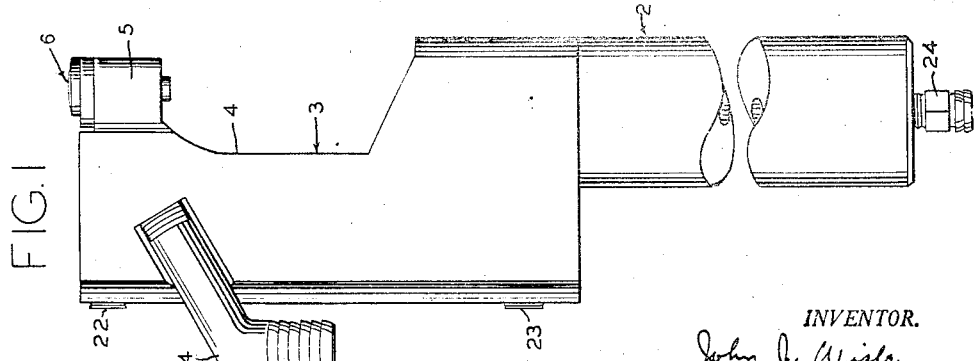
INVENTOR.
John J. Wisler
by
Walter T. Kaufman Patented Feb. 25, 1947

2,416,365

UNITED STATES PATENT OFFICE 2,416,365

FLUID COOLED ELECTRODE

John J. Wisler, Columbia, Pa., assignor to Armstrong Cork Company, Lancaster, Pa., a corporation of Pennsylvania Application December 2, 1944, Serial No. 566,269

1 Claim. (Cl. 219—4)

This invention relates to an electrode for use in resistance type spot welding machines in which the electrode is provided with heat dissipating means effective for extracting heat from the electrode tip and its associated holder.

It is well known that in the spot welding of aluminum alloys, it is necessary to consider two primary factors concerned with the matter of temperature control. First, a condition of thermal equilibrium must be established as rapidly as possible and second, the temperature of the tip body, and particularly the work engaging face of the electrode tip, should remain at an optimum low value, generally less than 10° C. If these important factors are not recognized and the conditions satisfied, the consistency of the weld shape and shear strength will be poor, particularly if thermal equilibrium is not rapidly established. This is difficult if adequate cooling is not provided for the electrode tip and its associated holding mechanism. Also, frequent cleaning of the electrode face will become necessary due to undesirable heating.

It is an object of my invention to provide an electrode having means for positively circulating a coolant directly to the welding tip and to the mechanism which holds the tip in place, thus satisfying the two conditions of rapid establishment of thermal equilibrium and maintenance of the optimum low temperature at the working face of the tip.

Another object of the invention is to provide an arrangement whereby a chamber for the reception and circulation of a cooling fluid is positioned for direct communication with the electrode tip and through which the attaching means for the tip is disposed so that both the tip proper and the attaching means are bathed with the coolant during use of the electrode.

In order that the invention may be readily understood, I will describe the same conjunction with the attached drawing in which:

Figure 1 is a side elevation, partly broken away, of a welding electrode of the offset or dogleg type, so-called;

Figure 2 is a top plan view of the electrode shown in Figure 1;

Figure 3 is a sectional view, partly broken away, of the electrode taken along the line III—III of Figure 2; and Figure 4 is a detailed sectional view to enlarged scale showing the coolant chamber disposed to receive the electrode tip and attached screw.

The electrode comprises a shank 2 which is adapted to be received and clamped in the electrode holder of a welding machine. The main body of the electrode 3 is preferably formed integrally with the shank 2 but obviously may be made separately and joined together. The body 3 is cut away as indicated at 4 to provide a leg 5 which extends outwardly from the body 3 and receives the electrode tip 6. This is a so-called dogleg type electrode and is commonly used in the fabrication of aluminum alloy parts for the aircraft industry where welding is often necessary in places normally not accessible with straight shank electrodes.

The tip 6 is shown to an enlarged scale in Figure 4. It consists of a circular tip or button portion 7 which in the embodiment shown has a convex working face 8. In some instances a flat work face is used and is preferred for certain types of work. The button 7 is formed integrally with a base portion 9. A stud or projection 10 is turned on the tip and is adapted to be received within a chamber 11, formed in the leg 5. The stud 10 is of a diameter such that when it is drawn into the chamber 11, it forms a fluid-tight seal therewith. An attaching screw 12 is provided for securing the tip 6 to the leg 5. A hollow head set screw may be used for this purpose and it is received within a screw threaded opening provided in the stud portion 10 and the base portion 9 of the tip 6. Preferably, the leg 5 is bored out as indicated at 13 to receive the head of the screw 12 and the screw 12 shoulders against the base of the recess 13. When the screw 12 is inserted, the tip 6 is brought down into engagement with the leg 5, with the stud portion 10 sealing the chamber 11. This arrangement permits convenient removal of the tip for cleaning or for replacement. The tip is the only part of the electrode which receives any real wear in use.

An arrangement is provided for the positive pressure circulation of fluid through the chamber 11 so that it is continuously supplied with a coolant, such as water, maintained at that temperature necessary to effect the desired optimum operating temperature at the working face 8 of the tip. The chamber 11 is sufficiently large to provide for the circulation of the coolant in a volume adequate to effect the extraction of considerable heat.

In the embodiment illustrated in the drawing, the cooling fluid is introduced through a pipe 14 which is threaded into the body of the electrode 3. The pipe 14 is connected to a suitable source of a cooling fluid and in the embodiment shown, provision is made for securing a piece of rubber tubing or the like to the pipe. As shown in Figure 3, a conduit 15 is formed in the electrode body and connects the pipe 14 with the chamber 11 in the leg 5. A discharge conduit 16 is also formed in the body 3 and communicates with the chamber 11. The conduit 16 is in open communication with other conduits 17, 18, 19, which pass through the length of the electrode. A flexible rubber tube or the like is attached to the electrode shank and is in communication with the discharge conduits.

For convenience in manufacturing the electrode from copper bar stock or other material commonly used in electrodes, the conduits 15, 16, 17, 18, and 19 are formed by drilling the openings. This necessitates the use of plugs for closing the exposed ends of the openings so that a positive circulation of the cooling fluid will be obtained. The plugs may be in the form of tapered hollow head screws which are threaded into bored and tapped openings in the body. Plug 20 is shown closing the upper end of the conduit 17. This plug is inserted and is then preferably ground flush with the upper surface 21 of the electrode body. A plug 22 closes the entrance end of the conduit 16 and a plug 23 closes the exposed end of the conduit 18. A pipe connection 24 is provided in conduit 19 and is similar to the pipe connection 14 and is adapted to receive a rubber tube which communicates with a suitable receptacle for the discharged coolant.

In operation of the electrode, cooling fluid is admitted from a suitable source through the pipe 14 and is conveyed through the conduit 16 into and through the chamber 11. Heat is extracted from the electrode tip 6, particularly from the portion of the stud 10 which is continuously bathed in the fluid. The connecting screw 13 passes directly through the chamber 11 and it too is bathed in the circulating cooling fluid. It is important that the cooling fluid be directed around and about the connecting screw 13 for it provides a large surface area for heat dissipation. Some heat is, of course, extracted from the tip 6 by conduction through the body of the leg 5 in which the chamber is formed. The cooling fluid passes from the chamber 11 through the conduits 16, 17, 18, and 19, and is finally discharged through the pipe connection 23.

By so disposing the chamber 11 for the cooling fluid that the tip proper is in direct communication with the fluid and the attaching screw 13 is also available for heat dissipation, I have greatly improved the operating results with the so-called dogleg type electrodes in the welding of aluminum.

It will be noted from an examination of Figures 2 and 4 that no sacrifice has been made in the strength of the electrode by the provision of the chamber 11, for the leg 5 is of considerable width and depth and a sizable body of metal surrounds the chamber 11. This is important when it is taken into consideration that in welding aluminum alloys, such as 24ST "Alclad" in thicknesses of .040", a welding force of 720 pounds may be developed by the electrodes and a forging force of 1,540 pounds may be used in completion of the weld.

While the arrangement is particularly desirable for use in dogleg type electrodes, it will also be found useful in offset tip electrodes, and in straight shank electrodes, although with the latter, the problem of cooling is not so acute for it is possible to core out or bore the electrode body to a point closely adjacent the electrode tip.

In actual practice, utilizing the electrode of this invention, the establishment of thermal equilibrium and maintenance of optimum low temperatures have been possible under severe conditions of operation and particularly good welds have resulted because of the facility with which the electrode may be brought to thermal equilibrium during the welding operation.

While I have illustrated and described a preferred embodiment of my invention, it will be understood that the invention is not limited thereto but may be otherwise embodied and practiced within the scope of the following claim.

I claim:

An offset tip electrode comprising an electrode body having an offset projection thereon of relatively narrow cross-section, a chamber formed in said offset projection having an opening in the top thereof to receive a welding tip and having an opening in the bottom thereof to accommodate an attaching screw for the tip, a conduit entering said chamber at a point adjacent the bottom thereof, a second conduit entering said chamber at a point adjacent the top thereof, the point of entrance of said conduits into said chamber being offset circumferentially in the wall of said chamber, said conduits serving to supply cooling fluid to and discharge the same from said chamber, the welding tip having a substantial portion thereof received within and exposed to said chamber closely adjacent the upper conduit opening therein and closing the top opening of said chamber, attaching means formed on the lower portion of said tip, and an attaching screw passing through the said opening in the bottom of said chamber and extending completely therethrough out of contact with the walls of said chamber for a substantial portion of the length of said screw, said screw engaging the attaching means formed on the tip and holding the tip in firm engagement with the offset projection.

JOHN J. WISLER.

REFERENCES CITED

The following references are of record in the file of this patent:

UNITED STATES PATENTS

| Number | Name | Date |
|---|---|---|
| 1,058,677 | Taylor | Apr. 8, 1913 |
| 1,267,463 | Schkommodau | May 28, 1918 |
| 1,435,812 | Cushing | Nov. 14, 1922 |
| 1,607,710 | Von Henke | Nov. 23, 1926 |